Dec. 19, 1967  J. J. LARKINS  3,358,870
HOLE CLOSURE FOR ELECTRICAL TERMINAL BOX
Filed May 10, 1965

INVENTOR
JOSEPH J. LARKINS

BY *Edward M. Farrell*

ATTORNEY 3,358,870
HOLE CLOSURE FOR ELECTRICAL
TERMINAL BOX
Joseph J. Larkins, 325 Delaware Ave.,
Riverside, N.J. 08075
Filed May 10, 1965, Ser. No. 454,382
5 Claims. (Cl. 220—27)

ABSTRACT OF THE DISCLOSURE

A one-piece metallic cap is used to plug a hole in an electrical terminal box. A plurality of fingers extend from a main head portion. When the cap is inserted into the hole and flattened, the fingers spread with the ends thereof engaging the interior of the box to maintain the cap securely in place.

---

Figure 1:
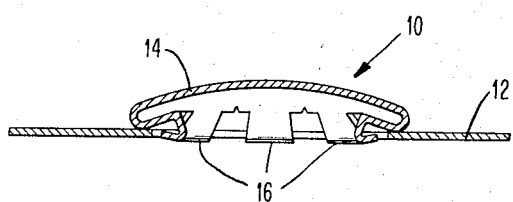

This invention relates to closure devices, and more particularly to knock out plug devices for closing holes in electrical terminal boxes.

One-piece closure buttons or knockout plugs for closing holes in terminal boxes have been and still are used extensively. These closure devices are used with electrical terminal boxes into which electrical cables or individual wires extend. Since it is generally not possible to predetermine the location of openings in standard boxes since the boxes may be mounted in a variety of different positions and locations, the boxes are provided with perforated areas which permits portions of the boxes to be knocked out to provide suitable openings. Upon completion of the installation, it is necessary to close any holes in the box which do not receive any cables or conduits therethrough.

In the past, closure elements have been in the form of circular plugs or buttons dimensioned to fit into and fill the holes in the box. Generally, such closure elements have included a plurality of flexible or spring-like fingers extending therefrom. The fingers are resilient so that when a plug element is pressed into a hole, the flexible fingers are compressed. When the closure element is completely inserted, the flexible fingers are shaped so that they spring back into their original position to provide tension to hold the closure in place.

While these closure devices offer advantages in facilitating the plugging of unnecessary holes in an electrical terminal box, they are not without some disadvantages. For example, the flexible fingers of such devices extend into the terminal box and may tend to short circuit or ground various electrical conductors within the box unless extreme care is exercised. Further, many electrical boxes are in environment which subject them to vibrations and shock tending to cause the closure to be accidentally removed from the hole.

In order to overcome the disadvantages mentioned above, workmen and electricans often resort to pliers to bend over or flatten the extending fingers to minimize the possibility of short circuits and to securely hold the plugs in place. Such a procedure is not only time consuming, and therefore costly, but in addition creates a situation where the plug may not be easily removed if changes to the installation is made necessary. Also, very often the wiring is so crowded within the box that bending of the fingers is often not practical.

It is an object of this invention to provide an improved knockout seal.

It is a further object of this invention to provide an improved knockout seal for an electrical box wherein the possibility of electrical short circuits with the seal is minimized.

It is still a further object of this invention to provide an improved knockout seal which will not be removed from an electrical terminal box when subjected to severe vibrations.

It is still a further object of this invention to provide an improved one-piece knockout plug which may be manufactured cheaply.

It is still a further object of this invention to provide an improved knockout plug which may be installed in a minimum of time and labor.

It is still a further object of this invention to provide an improved knockout plug which is held securely in place against jarring and vibrations but is still easily removable.

It is still a further object of this invention to provide an improved plug which is substantially aligned with the surface of a terminal box when it is installed.

In accordance with the present invention, a one piece knockout plug for sealing a hole in an electrical terminal box is provided. The plug comprises a main circular arcually shaped head element having a plurality of finger elements extending therefrom. When the plug element is inserted into a hole of the terminal box and the head element is flattened by a hammer blow, the ends of the fingers expand to physically engage the interior of the terminal box and held securely in place.

Figure 2:
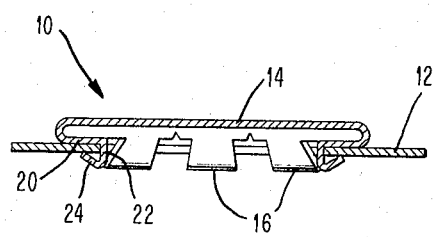
Figure 3:
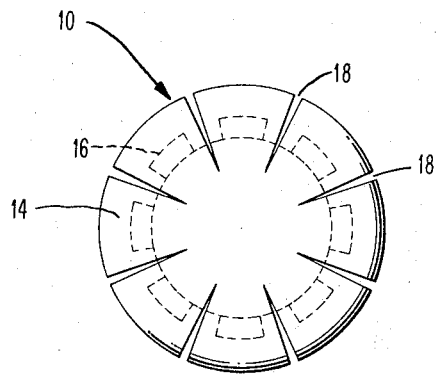

Other objects and advantages of the present invention will be apparent and suggest themselves to those skilled in the art, from a reading of the following specification and claims, in conjunction with the accompanying drawing, in which:

FIGURE 1 is a cross-sectional view of a knockout plug inserted into a hole of a terminal box, in accordance with the present invention;

FIGURE 2 is a view similar to FIGURE 1 wherein the knockout plug is illustrated in a flattened condition, and FIGURE 3 is a top view of the knockout plug, in accordance with the present invention, Referring particularly to FIGURE 1, a one-piece circular plug or closure element 10 is dimensioned to fit into an aperture of a wall 12 of an electrical terminal box, which, for example, may house the terminal connections of a plurality of electrical cables and/or conduits. The closure element 10 comprises a hollow collapsible head portion 14 having a plurality of finger elements 16 extending therefrom.

In FIGURE 1 the closure element 10 is illustrated when it is first inserted into the opening of the terminal box wall 12. The closure element may be formed by a single piece of sheet metal. After the piece is punched, it is bent or shaped into the shape desired by methods and means well known to those skilled in the art. The material of which the closure element is made may be light gage sheet metal or any other suitable type metal.

The collapsible portion 14 is curved so that the finger elements 16 are normally in retracted positions. After the closure device 10 has been inserted into the terminal box, the curved head portion 14 may be struck by a hammer, for example, to cause it to become flat, as illustrated in FIGURE 2. When the head portion 14 is flattened, the finger elements 16 expand to physically engage the interior surface of the wall 12, in a manner to be described.

Referring to FIGURE 3, the head portion 14 includes a plurality of slits 18 which are cut when the closure device 10 is punched during the initial manufacturing operation. These slits facilitate the forming of the arcuate or curved surface of the head portion 14. In addition, the slits permit the head portion 14 to spread or expand easily when it is flattened by a hammer blow.

The circumference of the head portion 14 is wider than the circumference formed by the finger elements 16. This permits situations in which the same dimensioned closure device 10 may be used when the apertures of the terminal box are of slightly different sizes.

Each of the finger elements 16 are formed in substantially the same manner and may be considered as comprising a portion 20, a portion 22 and a portion 24.

The first portion 20 is folded back upon the main head portion 14 and extends from the circumference thereof towards the center of the collapsible head. The second portion 22, integrally connected to the first portion 20, extends angularly away from the head portion 20. The third portion 24 extends from the second portion 22 angularly back towards the circumference of the main head portion 14.

Ideally the portion 22 may be the same in dimension as the thickness of the wall of the terminal box. In this case, when the closure device is installed, it will be substantially flat with the portions 20 and 24 extending substantially parallel with the surface of the box with the portion 24 engaging the inner surface of the box. However, when different thicknesses of the walls and different sized apertures are encountered, the portion 22 is generally made somewhat larger with the portion 24 extending slightly into the box when it is installed.

The angular relationship between the three portions 20, 22 and 24 are predetermined to securely hold the closure device 10 in place when it is installed. When closure device 10 is inserted into the hole of the terminal box it may be flattened by a hammer blow. The finger elements 16 then spread in a manner so that the ends of the portions 24 physically engages the inner surface of the wall 12.

While the portions of the extending fingers have been illustrated as having relatively sharp corners, the angles may actually be somewhat curved. The precise number of fingers employed will depend upon the particular design. Various modifications other than the embodiment illustrated may, of course, be used without departing from the scope of the present invention.

What is claimed is:

1. A one-piece knockout seal for plugging an opening in an electrical box comprising a hollow circular main head portion having an arcuate surface, a plurality of fingers extending from said head portion, said fingers including first, second and third bent portion extending from said main head portion, said first portions extending from the circumference inwardly toward the center of said main head portion, said second portions extending at an angle away from said head portion, said third portions extending outwardly away from the center towards the circumference of said head portion, whereby when said arcuate surface of said head portion is flattened said second portions are moved axially with respect to said head portion and said third portions extend outwardly away from the axis of said head portion so that the ends thereof physically engage the interior surface of said electrical box.

2. A one-piece knockout seal for plugging an opening in an electrical box comprising a hollow circular arcuate main head portion having an arcuate surface, said main head element including a plurality of sectors formed by a plurality of slits in said head element, a plurality of fingers extending from said sectors of said head portion, said fingers including first, second and third bent portions extending from said main head portion, said first portions being folded back on said head elements and extending from the circumference inwardly toward the center of said main head portion, said second portion extending at an angle away from said head portions, said third portions extending outwardly away from the center towards the circumference of said head portion, whereby when said arcuate surface of said head portion is flattened said second portions are moved axially with respect to said head portion and said third portions extend outwardly away from the axis of said head portion so that the ends thereof physically engage the interior surface of said electrical box.

3. A single unit plug element for plugging a hole in an electrical terminal box comprising a main circular arcually shaped head element having integral fingers extending therefrom, said fingers including first, second and third portions, said first portions being folded back and extending from the circumference of said main head element towards the center of said main head portion in substantially parallel relationship therewith, said second portions extending from said first portions angularly away from said main head portion, said third portions extending from said second portions angularly towards the circumference of said main head element, the angular relationship between said first, second and third portions being such that when said plug element is inserted into a hole of a terminal box and said arcually shaped head element is flattened the ends of said third portions physically engage said terminal box to hold said plug element securely in place.

4. A punched out single unit metallic plug element for plugging a hole in an electrical terminal box comprising a main circular arcually shaped head element, said head element including a plurality of sections formed by a plurality of slits extending inwardly from the circumference towards the center of said head element, said head element having integral first, second and third portions extending from said sectors of said head element, said first portions being folded back and extending from the circumference of said main head element towards the center of said main head portion in substantially parallel relationship therewith, said second portions extending from said first portions angularly away from said main head portion, said third portions extending from said second portion angularly towards the circumference of said main head element, the angular relationship between said first, second and third portions being such that when said plug element is inserted into a hole of a terminal said plug element is inserted into a hole of a terminal box and said arcually shaped head element is flattened the ends of said third portions physically engage said terminal box to hold said plug securely in place.

5. The invention as set forth in claim 4 wherein said third portions become substantially parallel with said first portions when said plug element is installed in said terminal box and said head element is in a flattened condition.

References Cited

UNITED STATES PATENTS

| | | | |
|---|---|---|---|
| 1,491,325 | 4/1924 | Thomas | 220—27 |
| 2,444,268 | 6/1948 | Peters | 220—27 |
| 3,072,287 | 1/1963 | Sampson | 220—24 X |
| 3,080,993 | 3/1963 | Livingstone | 220—24.5 |

THERON E. CONDON, *Primary Examiner.*

GEORGE E. LOWRANCE, *Examiner.*